United States Patent Office 3,444,245
Patented May 13, 1969

---

3,444,245
PROCESS FOR MAKING 4,4'-BIS-HYDROXYALKYL ETHERS OF STILBENE
Rolf Sieber, Cologne-Longerich, Germany, assignor to Wacker-Chemie G.m.b.H., Munich, Bavaria, Germany, a corporation of Germany
No Drawing. Filed Aug. 16, 1967, Ser. No. 660,904
Claims priority, application Germany, Aug. 17, 1966, W 42,236
Int. Cl. C07c 41/02, 43/20
U.S. Cl. 260—613       1 Claim

---

ABSTRACT OF THE DISCLOSURE

This invention relates to 4,4'-bis-hydroxyalkyl ethers of stilbene, and it has for its object to provide a simple and efficient process for making such compounds.

---

SUMMARY OF THE INVENTION

I have discovered that one can obtain 4,4'-bis-hydroxyalkyl ethers of stilbene which contain two reactionable aliphatic hydroxyl groups in the molecule, corresponding to the formula

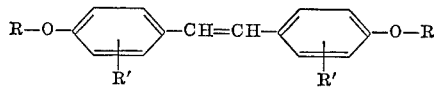

where R represents a primary or secondary uni- or polyvalent alcohol residue, R' hydrogen and/or one or several halogen atoms and/or one or several alkyl groups, in a simple manner and with excellent yields when one condenses hydroxyalkyl phenyl ether of the general formula

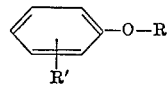

where R represents a primary or secondary uni- or polyvalent alcohol residue with 1–12, preferably 2–6 C atoms, R' hydrogen and/or one or several halogen atoms and/or one or several alkyl groups, with monohalogenated acetaldehyde in the presence of glacial acetic acid with concentarted sulphuric acid at temperatures of −10 to +25° C., and transposes the condensation product by heating to temperatures of 150 to 220° C., if necessary in the presence of a suitable solvent, while splitting off hydrogen halide—into the corresponidng stilbene.

DESCRIPTION OF THE PREFERRED EMBODIMENTS

According to the invention, for hydroxyalkyl phenyl ethers one can use for instance phenoxyethanol, 1-phenoxypropanol-3, 1-phenoxypropanol-2, 1-phenoxy-butanol.

According to the invention, the mono-halogenated acetaldehyde used for condensation can properly be in the form of its acetals, particularly of dimethyl or diethyl acetal.

It is appropriate to perform the transposition of the condensaiton product under dehydrohalogenation in the presence of a suitable solvent such as ethylene glycol, diethylene glycol monomethyl ether or nitrobenzene.

The 4,4'-bis-hydroxyalkyl ethers of stilbene made according to the process of the invention, containing two reactionable aliphatic hydroxyl groups in the side chains, are used as bi-functional components in the synthesis of polycondensation products, and as optical brighteners.

Example 1

Into a solution, cooled to 0° C., of 166 g. (1.2 mol) phenoxyethyl alcohol and 91.5 g. (0.6 mol) monochloroacetaldehyde diethyl acetal in 225 ml. glacial acetic acid one adds under stirring, a mixture, cooled to 0° C., of 150 ml. concentrated sulphuric acid and 150 g. glacial acetic acid in such a manner that the temperautre in the reaction mixture does not rise above 6° C. After adding the sulphuric acid one permits the reaction mixture, under continued stirring, to warm up to room temperature, pours it subsequently on ice, and takes up the organic phase in ether. After removing the ether the residue is mixed with ethylene glycol and the solution is heated up to the boiling point of the solvent. Thus one obtains, while splitting off the hydrochloric acid, 153 g. of the 4,4'-bis-hydroxyethyl ether of stilbene with F.P. 254° C., corresponding to a yield of 85% of theory referred to the monochloracetaldehyde diethyleacetal used.

Example 2

In the same manner one obtains from 1-phenoxypropanol-3 with a yield of 80% of theory, referred to the monochloroacetaldehyde diacetal, the 4,4'-bis-ω-hydroxypropyl ether of stilbene. F.P. 221° C.

Example 3

In the same manner one can produce from β-γ-dihydroxypropyl phenyl ether the 4,4'-bis-β-γ-dihydroxypropyl ether of stilbene. F.P. 291° C. Yield 91%.

Example 4

In the same manner one can produce from the o-methylphenoxy ethanol the 4,4'-bis-hydroxyethyl ether of the 3,3'-dimethyl stilbene. F.P. 203° C. Yield 90%.

The invention claimed is:
1. Process for making 4,4'-bis-hydroxyalkyl ethers of stilbene according to the general formula

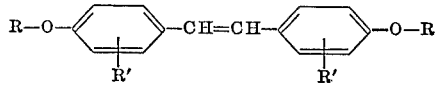

wherein R and R' are as subsequently described, characterized by the fact that one condenses hydroxyalkylphenyl ether of the general formula

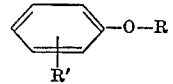

wherein R is alkyl of 1 to 12 C atoms substituted by at least one but no more than two hydroxyl groups, said hydroxyls being either primary or secondary, R' is selected from the group consisting of hydrogen and methyl, with a compound selected from the group consisting of the dimethyl acetal of chloroacetaldehyde and the diethyl acetal of chloroacetaldehyde in the presence of glacial acetic acid with sulphuric acid at temperatures between −10 and +25° C., and that the condensation product is converted into the corresponding stilbene by heating to a temperature of 150 to 220° C. while splitting off hydrogen halide.

References Cited

FOREIGN PATENTS

| | | |
|---|---|---|
| 488,378 | 11/1952 | Canada. |
| 497,382 | 11/1953 | Canada. |
| 534,394 | 12/1956 | Canada. |
| 1,121,559 | 5/1956 | France. |
| 622,561 | 5/1949 | Great Britain. |

OTHER REFERENCES

Zaheer et al., Jour. Chem. Soc. (London) (1954), pp. 3360–3362.

BERNARD HELFIN, *Primary Examiner.*